(12) United States Patent
Wu et al.

(10) Patent No.: US 11,517,099 B2
(45) Date of Patent: Dec. 6, 2022

(54) METHOD FOR PROCESSING IMAGES, ELECTRONIC DEVICE, AND STORAGE MEDIUM

(71) Applicant: BEIJING DAJIA INTERNET INFORMATION TECHNOLOGY CO., LTD., Beijing (CN)

(72) Inventors: Shanshan Wu, Beijing (CN); Paliwan Pahaerding, Beijing (CN); Bo Wang, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 70 days.

(21) Appl. No.: 17/100,720

(22) Filed: Nov. 20, 2020

(65) Prior Publication Data
US 2021/0153629 A1 May 27, 2021

(30) Foreign Application Priority Data
Nov. 21, 2019 (CN) .......................... 201911150663.0

(51) Int. Cl.
*G06V 40/16* (2022.01)
*A45D 44/00* (2006.01)

(52) U.S. Cl.
CPC ......... *A45D 44/005* (2013.01); *G06V 40/168* (2022.01)

(58) Field of Classification Search
CPC .. A45D 44/005; G06V 40/168; G06V 10/757; G06K 9/629; G06T 19/20; G06T 3/0012
See application file for complete search history.

(56) References Cited

U.S. PATENT DOCUMENTS

| | | | |
|---|---|---|---|
| 10,467,793 B2* | 11/2019 | Viklund | G06V 40/165 |
| 11,037,281 B2* | 6/2021 | Shen | G06V 40/165 |
| 2012/0183238 A1* | 7/2012 | Sawides | G06V 20/64 |
| | | | 382/285 |

* cited by examiner

*Primary Examiner* — Phuoc Tran
(74) *Attorney, Agent, or Firm* — Knobbe, Martens, Olson & Bear, LLP

(57) ABSTRACT

A method for processing images includes: detecting a plurality of human face key points of a three-dimensional human face in a target image; acquiring a virtual makeup image, wherein the virtual makeup image includes a plurality of reference key points, the reference key points indicating human face key points of a two-dimensional human face; and acquiring a target image fused with the virtual makeup image by fusing the virtual makeup image and the target image with each of the reference key points in the virtual makeup image aligned with a corresponding human face key point.

16 Claims, 5 Drawing Sheets

METHOD FOR PROCESSING IMAGES, ELECTRONIC DEVICE, AND STORAGE MEDIUM

This application is based on and claims priority under 35 U.S.C. 119 to Chinese patent application No. 201911150663.0, filed on Nov. 21, 2019, in the China National Intellectual Property Administration, the disclosure of which is incorporated herein by reference in its entirety.

TECHNICAL FIELD

The present disclosure relates to the field of image processing, and in particular, relates to a method for processing images, an electronic device, and a storage medium.

BACKGROUND

With rapid development of image processing technologies, more and more image processing functions have emerged. At present, not only are there more and more requirements for image processing functions, but also the requirements for image processing effects are getting higher and higher. Adding virtual makeup has become a commonly-used method for processing images. When adding virtual makeup to an image with an image processing technology, the degree of fit between the three-dimensional human face and the virtual makeup in the added image may directly affect the display effect of the added image, so how to enhance the fit degree between the two in the image processing process becomes a key.

SUMMARY

The present disclosure provides a method for processing images, an electronic device, and a storage medium.

According to one aspect of embodiments of the present disclosure, a method for processing images is provided. The method includes:
  acquiring a target image;
  detecting a plurality of human face key points of a three-dimensional human face in the target image;
  acquiring a virtual makeup image, wherein the virtual makeup image includes a plurality of reference key points, the reference key points including human face key points of a two-dimensional human face; and
  acquiring a target image fused with the virtual makeup image by fusing the virtual makeup image and the target image with each of the reference key points in the virtual makeup image aligned with a corresponding human face key point.

According to another aspect of embodiments of the present disclosure, an electronic device is provided. The electronic device includes:
  one or more processors; and
  a volatile or non-volatile memory configured to one or more computer programs including one or more instructions executable by the one or more processors,
  wherein the one or more instructions, when executed by the one or more processors, cause the one or more processors to perform a method including:
    acquiring a target image;
    detecting a plurality of human face key points of a three-dimensional human face in the target image;
    acquiring a virtual makeup image, wherein the virtual makeup image includes a plurality of reference key points, the reference key points including human face key points of a two-dimensional human face; and
    acquiring a target image fused with the virtual makeup image by fusing the virtual makeup image and the target image with each of the reference key points in the virtual makeup image aligned with a corresponding human face key point.

According to yet another aspect of embodiments of the present disclosure, a non-transitory computer-readable storage medium storing one or more computer programs including one or more instructions is provided. the one or more instructions, when executed by a processor of an electronic device, cause the electronic device to perform a method including:
  acquiring a target image;
  detecting a plurality of human face key points of a three-dimensional human face in the target image;
  acquiring a virtual makeup image, wherein the virtual makeup image includes a plurality of reference key points, the reference key points including human face key points of a two-dimensional human face; and
  acquiring a target image fused with the virtual makeup image by fusing the virtual makeup image and the target image with each of the reference key points in the virtual makeup image aligned with a corresponding human face key point.

According to yet another aspect of embodiments of the present disclosure, a computer program product including one or more instructions is provided. The one or more instructions, when executed by a processor of an electronic device, causes the electronic device to perform a method including:
  acquiring a target image;
  detecting a plurality of human face key points of a three-dimensional human face in the target image;
  acquiring a virtual makeup image, wherein the virtual makeup image includes a plurality of reference key points, the reference key points including human face key points of a two-dimensional human face; and
  acquiring a target image fused with the virtual makeup image by fusing the virtual makeup image and the target image with each of the reference key points in the virtual makeup image aligned with a corresponding human face key point.

It should be understood that the above general descriptions and the following detailed descriptions only provide examples and are illustrative, and cannot limit the present disclosure.

BRIEF DESCRIPTION OF DRAWINGS

The accompanying drawings, which are incorporated in and constitute a part of this specification, illustrate embodiments consistent with the present disclosure, and together with the description, serve to explain the principles of the present disclosure.

DESCRIPTION OF EMBODIMENTS

Reference is now made in detail to various embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with aspects related to the present disclosure as recited in the appended claims.

With regard to the devices in the above embodiments, the way in which the respective modules perform the operations has been described in detail in the embodiment relating to the method, which is not explained in detail herein.

User information involved in the present disclosure is information authorized by a user or fully authorized by all parties.

An embodiment of the present disclosure provides a method for processing images capable of fusing a virtual makeup image in a human face area of an image. The method is applicable to various scenarios.

The method according to this embodiment is applicable to a live video scenario. In live streaming, a virtual makeup image may be fused with a human face image in a live streaming interface by the method according to this embodiment so as to reflect the effect of adding virtual makeup to a human face.

Alternatively, the method according to this embodiment is applicable to a picture beautification scenario. When the user beautifies any human face picture, a virtual makeup image may be fused with the human face picture by the method according to this embodiment to add virtual makeup to a human face in the human face picture so as to achieve a beautifying effect.

A method for processing images according to an embodiment of the present disclosure is applicable to a device for processing images. The device is configured to: acquire a target image, detect a plurality of human face key points of a three-dimensional human face in the target image, acquire a virtual makeup image, and acquire a target image fused with the virtual makeup image by fusing, based on positions of the human face key points and positions of the reference key points, the virtual makeup image and the target image with each of the reference key points in the virtual makeup image aligned with a corresponding human face key point.

The device is a server, a terminal or other device having a processing function. The terminal is a mobile phone, a tablet computer, a computer or other types of terminals. The server is a server, or a server cluster composed of several servers, or a cloud computing service center.

Figure 1:
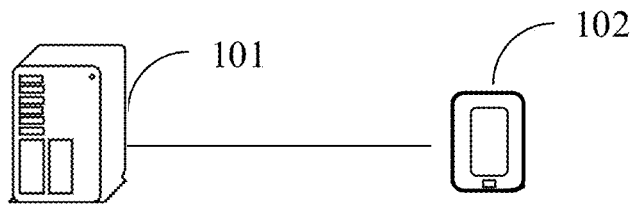
FIG. 1 is a schematic structural diagram of an application environment according to an embodiment.

In some embodiments, when the device is a server 101, as shown in FIG. 1, the server 101 is connected to a terminal 102 by a communication network, and may provide the terminal 102 with background image processing services. The terminal 102 sends a target image to the server 101. After fusing a virtual makeup image and the target image, the server 101 sends a target image fused with the virtual makeup image to the terminal 102, and the terminal 102 displays the target image fused with the virtual makeup image.

In some embodiments, when the device is a terminal, the terminal acquires a target image and acquires a target image fused with a virtual makeup image by fusing the virtual makeup image and the target image. The terminal may display the target image fused with the virtual makeup image to display the effect of adding virtual makeup to a three-dimensional human face in the target image.

Figure 2:
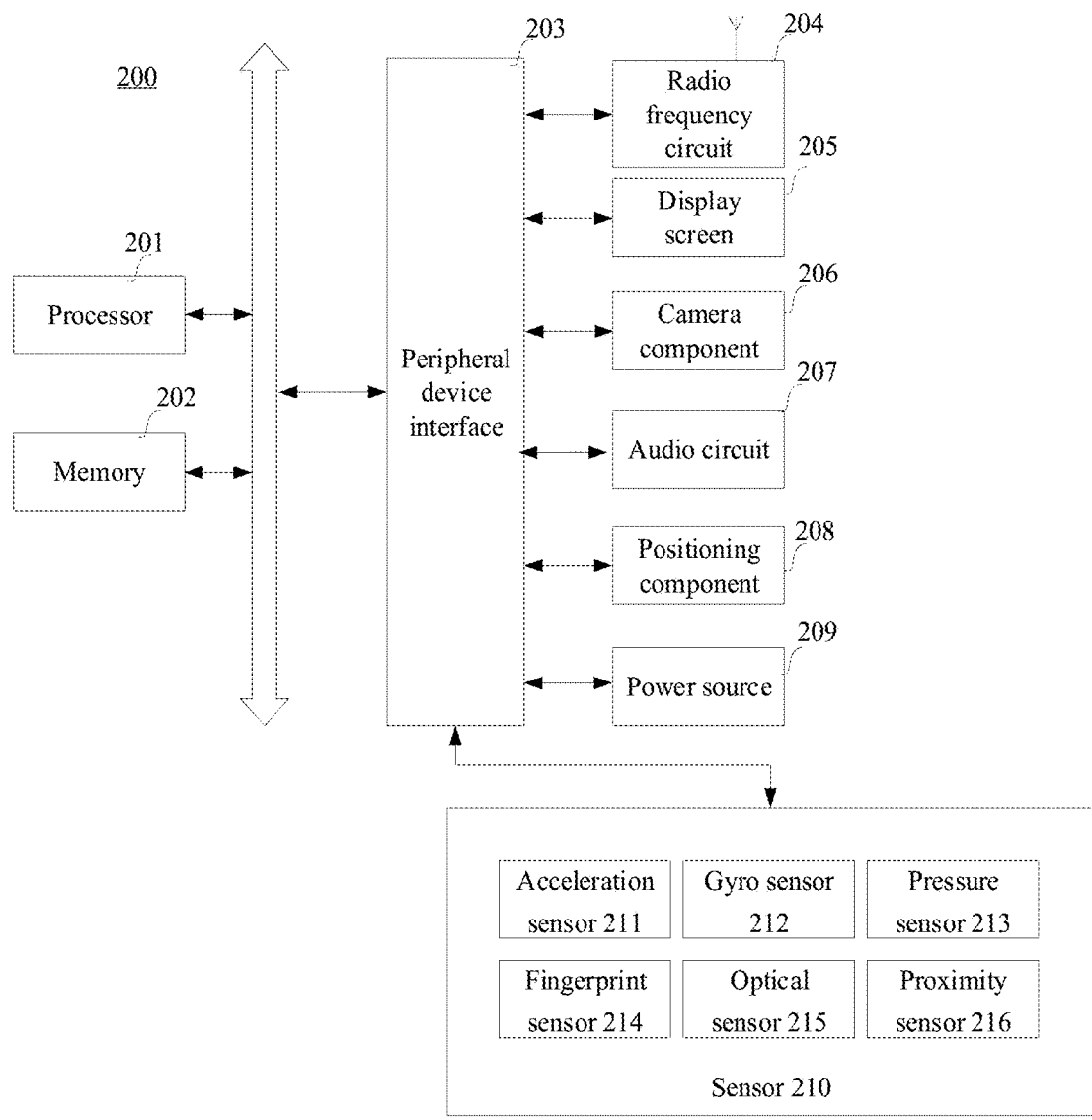
FIG. 2 is a block diagram of a terminal according to an embodiment.

FIG. 2 is a block diagram of a terminal according to one embodiment of the present disclosure. The display device 200 may be such a portable mobile display device as a smartphone, a tablet PC, a Moving Picture Experts Group Audio Layer III (MP3) player, a Moving Picture Experts Group Audio Layer IV (MP4) player, a laptop, or a desk computer. The terminal 200 may also be called user equipment (UE), a portable display device, a laptop display device, a desk terminal, or the like.

Generally, the terminal 200 includes one or more processors 201 and one or more memories 202.

The one or more processors 201 may include one or more processing cores, such as a 4-core processor or an 8-core processor. The one or more processors 201 may be practiced by at least one hardware of a digital signal processor (DSP), a field-programmable gate array (FPGA), and a programmable logic array (PLA). The one or more processors 201 may also include a main processor and a coprocessor. The main processor is a processor configured to process data in an active state, and is also referred to as a central processing unit (CPU). The coprocessor is a low-power-consumption processor configured to process data in a standby state. In some embodiments, the one or more processors 201 may be integrated with a graphics processing unit (GPU), which is configured to render and draw content that needs to be displayed by a display screen. In some embodiments, the one or more processors 201 may also include an Artificial Intelligence (AI) processor configured to process computational operations related to machine learning.

The one or more memories 202 may include one or more computer-readable storage mediums, which can be non-transitory in some embodiments. The one or more memories 202 may also include a volatile memory or a non-volatile memory, such as one or more disk storage devices and flash storage devices. In some embodiments, the non-transitory computer-readable storage medium in the one or more memories 202 is configured to store one or more computer programs including one or more instructions. The one or more computer programs, when loaded and run by the one or more processors 201, cause the one or more processors 201 to perform a method for processing images. The method includes: acquiring a target image; detecting a plurality of human face key points of a three-dimensional human face in the target image; acquiring a virtual makeup image, wherein the virtual makeup image includes a plurality of reference key points, the reference key points including human face key points of a two-dimensional human face; acquiring a target image fused with the virtual makeup image by fusing the virtual makeup image and the target image with each of the reference key points in the virtual makeup image aligned with a corresponding human face key point.

In some embodiments, the virtual makeup image is acquired by: detecting a plurality of human face key points of a three-dimensional human face in a first template image; acquiring a second template image by tiling the three-dimensional human face in the first template image, wherein the second template image includes a two-dimensional human face and a plurality of human face key points of the two-dimensional human face; and generating the virtual makeup image based on the two-dimensional human face in the second template image, wherein the human face key points of the two-dimensional human face are taken as the reference key points of the virtual makeup image.

In some embodiments, the one or more computer programs, when loaded and run by the one or more processors 201, cause the one or more processors 201 to execute instructions for: acquiring a plurality of first combined areas which do not overlap with one another, wherein each of the plurality of first combined areas is acquired by combining at least three human face key points in the target image; acquiring a plurality of second combined areas which do not overlap with one another, wherein each of the plurality of second combined areas is acquired by combining reference key points corresponding to the at least three human face key points of a corresponding first combined area; and acquiring the target image fused with the virtual makeup image by fusing, based on positions of the first combined areas and positions of the second combined areas, the virtual makeup image and the target image with each of the first combined areas coinciding with a corresponding second combined area in the virtual makeup image.

In some embodiments, the one or more computer programs, when loaded and run by the one or more processors 201, cause the one or more processors 201 to execute instructions for: acquiring the first combined areas which do not overlap with one another by combining at least three human face key points of the human face key points each time for multiple times based on a preset sequence of the human face key points; and acquiring the second combined areas which do not overlap with one another by combining at least three reference key points of the reference key points for every time based on a preset sequence of the reference key points.

In some embodiments, the one or more computer programs, when loaded and run by the one or more processors 201, cause the one or more processors 201 to execute instructions for: adjusting a size and angle of any of the second combined areas based on a size and angle of a corresponding first combined area, and covering the corresponding first combined area with the adjusted second combined area.

In some embodiments, the one or more computer programs, when loaded and run by the one or more processors 201, cause the one or more processors 201 to execute instructions for: acquiring first sequence identifiers of the plurality of human face key points and second sequence identifiers of the plurality of reference key points, wherein the first sequence identifiers have a one-to-one correspondence with the second sequence identifiers; and acquiring the target image fused with the virtual makeup image by fusing, based on the positions of the human face key points and the first sequence identifiers and the positions of the reference key points and the second sequence identifiers, the virtual makeup image and the target image with each of the reference key points in the virtual makeup image aligned with a human face key point having a corresponding sequence identifier.

In some embodiments, the one or more computer programs, when loaded and run by the one or more processors 201, cause the one or more processors 201 to execute instructions for: acquiring a virtual makeup image set including a plurality of virtual makeup images arranged in a sequence; and selecting one virtual makeup image from the virtual makeup images each time according to the sequence of the virtual makeup images.

In some embodiments, the one or more computer programs, when loaded and run by the one or more processors 201, cause the one or more processors 201 to execute instructions for: acquiring a video frame sequence including a plurality of video frames arranged in a sequence; and selecting a video frame from the video frames according to the sequence of the video frames each time as the target image.

In some embodiments, the one or more computer programs, when loaded and run by the one or more processors 201, cause the one or more processors 201 to execute instructions for: acquiring a virtual makeup image set including a plurality of virtual makeup images arranged in a sequence; and selecting a virtual makeup image having a same sequential number with a currently acquired target image from the plurality of virtual makeup images.

In some embodiments, the terminal 200 also includes a peripheral device interface 203 and at least one peripheral device. The processor 201, the memory 202, and the peripheral device interface 203 may be connected by a bus or a signal line. Each peripheral device may be connected to the peripheral device interface 203 by a bus, a signal line, or a circuit board. For example, the peripheral device includes at least one of a radio frequency circuit 204, a display panel 205, a camera component 206, an audio circuit 207, a positioning component 208, and a power source 209.

The peripheral device interface 203 may be configured to connect at least one peripheral device associated with an Input/Output (I/O) to the processor 201 and the memory 202. In some embodiments, the processor 201, the memory 202, and the peripheral device interface 203 are integrated on the same chip or circuit board. In some other embodiments, any one or two of the processor 201, the memory 202 and the peripheral device interface 203 may be implemented on a separate chip or circuit board, which is not limited in this embodiment.

The radio frequency circuit 204 is configured to receive and transmit a radio frequency (RF) signal, which is also referred to as an electromagnetic signal. The radio frequency circuit 204 communicates with a communication network and other communication devices via the electromagnetic signal. The radio frequency circuit 204 converts the electrical signal into the electromagnetic signal for transmission, or converts the received electromagnetic signal into the electrical signal.

In some embodiments, the radio frequency circuit 204 includes an antenna system, an RF transceiver, one or more amplifiers, a tuner, an oscillator, a digital signal processor, a codec chipset, a subscriber identity module card, and the like. The radio frequency circuit 204 can communicate with other display devices via at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a wireless fidelity (Wi-Fi) network. In some embodiments, the RF circuit 204 may also include near-field communication (NFC) related circuits, which is not limited in the present disclosure.

The display panel 205 is configured to display a user interface (UI). The UI may include graphics, text, icons, videos, and any combination thereof. When the display panel 205 is a touch display screen, the display panel 205 also has the capacity to acquire touch signals on or over the surface of the display panel 205. The touch signal may be input into the processor 201 as a control signal for processing. At this time, the display panel 205 may also be configured to provide virtual buttons and/or virtual keyboards, which are also referred to as soft buttons and/or soft keyboards. In some embodiments, one display panel 205 may be disposed on the front panel of the terminal 200. In some other embodiments, at least two display panels 605 may be disposed respectively on different surfaces of the terminal 200 or in a folded design. The display panel 205 may be a liquid crystal display (LCD) panel, an organic light-emitting diode (OLED) panel or the like.

The camera component 206 is configured to capture images or videos. In some embodiments of the present disclosure, the camera component 206 includes a front camera and a rear camera. Usually, the front camera is placed on the front panel of the display device, and the rear camera is placed on the back of the display device. In some embodiments, at least two rear cameras are disposed, and are at least one of the main cameras, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 206 may also include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 207 may include a microphone and a speaker. The microphone is configured to collect sound waves of users and environments, and convert the sound waves into electrical signals which are input into the processor 201 for processing, or input into the RF circuit 204 for voice communication. For the purpose of stereo acquisition or noise reduction, there may be a plurality of microphones respectively disposed at different locations of the terminal 200. The microphone may also be an array microphone or an omnidirectional acquisition microphone. The speaker is then configured to convert the electrical signals from the processor 201 or the radio frequency circuit 204 into the sound waves. The speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 207 may also include a headphone jack.

The positioning component 208 is configured to locate the current geographic location of the terminal 200 to implement navigation or a location-based service (LBS). In some embodiments, the positioning component 608 may be the global positioning system (GPS) from the United States, the Beidou positioning system from China, the Grenas satellite positioning system from Russia or the Galileo satellite navigation system from the European Union.

The power source 209 is configured to power up various components in the terminal 200. The power source 209 may be an alternating current, direct current, a disposable battery, or a rechargeable battery. When the power source 209 includes the rechargeable battery, the rechargeable battery may support wired or wireless charging. The rechargeable battery may also support the fast charging technology.

In some embodiments, the terminal 200 also includes one or more sensors 210. The one or more sensors 210 include, but are not limited to, an acceleration sensor 211, a gyro sensor 212, a pressure sensor 213, a fingerprint sensor 214, an optical sensor 215, and a proximity sensor 216.

The acceleration sensor 211 may detect magnitudes of accelerations on three coordinate axes of a coordinate system established by the terminal 200. For example, the acceleration sensor 211 may be configured to detect components of a gravitational acceleration on the three coordinate axes. The processor 201 may control the touch display panel 205 to display a user interface in a landscape view or a portrait view based on a gravity acceleration signal collected by the acceleration sensor 211. The acceleration sensor 211 may also be configured to collect motion data of a game or a user.

The gyro sensor 212 can detect a body direction and a rotation angle of the terminal 200, and can cooperate with the acceleration sensor 211 to collect a 3D motion of the user on the terminal 200. Based on the data collected by the gyro sensor 212, the processor 201 can serve the following functions: motion sensing (such as changing the UI based on a user's tilt operation), image stabilization during shooting, game control and inertial navigation.

The pressure sensor 213 may be disposed on a side frame of the terminal 200 and/or a lower layer of the touch display panel 205. When the pressure sensor 213 is disposed on the side frame of the terminal 200, a user's holding signal to the terminal 200 can be detected. The processor 201 can perform left-right hand recognition or quick operation based on the holding signal collected by the pressure sensor 213. When the pressure sensor 213 is disposed on the lower layer of the touch display panel 205, the processor 201 controls an operable control on the UI based on a user's pressure operation on the touch display panel 205. The operable control includes at least one of the button controls, the scroll bar controls, the icon controls and the menu controls.

The fingerprint sensor 214 is configured to collect a user's fingerprint. The processor 201 identifies the user's identity based on the fingerprint collected by the fingerprint sensor 214, or the fingerprint sensor 214 identifies the user's identity based on the collected fingerprint. When the user's identity is identified as trusted, the processor 201 authorizes the user to perform related sensitive operations, such as unlocking the screen, viewing encrypted information, downloading software, paying, and changing settings. The fingerprint sensor 214 may be provided on the front, back, or side of the terminal 200. When the terminal 200 is provided with a physical button or a manufacturer's logo, the fingerprint sensor 214 may be integrated with the physical button or the manufacturer's logo.

The optical sensor 215 is configured to collect ambient light intensity. In one embodiment, the processor 201 may control the display brightness of the touch display panel 205 based on the ambient light intensity collected by the optical sensor 215. For example, when the ambient light intensity is high, the display brightness of the touch display panel 205 is increased; and when the ambient light intensity is low, the display brightness of the touch display panel 205 is decreased. In another embodiment, the processor 201 may also dynamically adjust shooting parameters of the camera component 206 based on the ambient light intensity collected by the optical sensor 215.

The proximity sensor 216, also referred to as a distance sensor, is usually disposed on the front panel of the terminal 200. The proximity sensor 216 is configured to capture a distance between the user and a front surface of the terminal 200. In one embodiment, when the proximity sensor 216 detects that the distance between the user and the front surface of the terminal 200 becomes gradually smaller, the processor 201 controls the touch display panel 205 to switch from a screen-on state to a screen-off state. When it is detected that the distance between the user and the front surface of the terminal 200 gradually increases, the processor 201 controls the touch display panel 205 to switch from the screen-off state to the screen-on state.

It will be understood by those skilled in the art that the structure shown in FIG. 2 does not constitute a limitation to the terminal 200, and may include more or fewer components than those illustrated, or combine some components or adopt different component arrangements.

Figure 3:
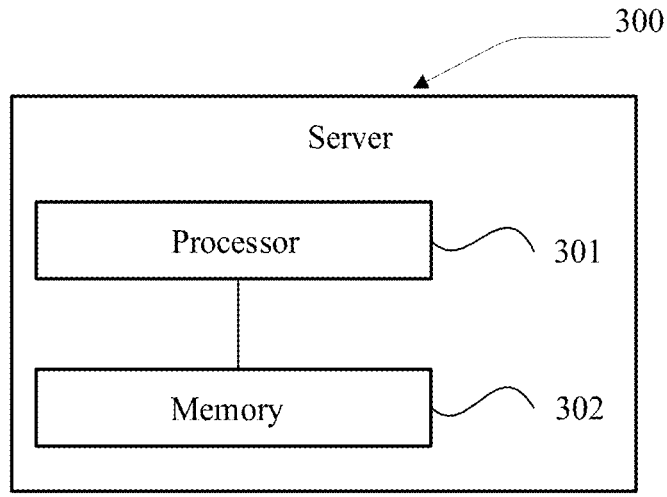
FIG. 3 is a schematic structural diagram of a server according to an embodiment.

FIG. 3 is a block diagram showing a server according to an embodiment of the present disclosure. For example, the server 300 may vary significantly in configuration or capabilities, and may include one or more processors 301, for example, one or more central processing units (CPUs), and one or more memories 302. The one or more memories 302 store one or more computer programs including one or more instructions. The one or more computer programs, when loaded and run by the one or more processors 301, cause the one or more processors 301 to perform a method for processing images. The method includes: acquiring a target image; detecting a plurality of human face key points of a three-dimensional human face in the target image; acquiring a virtual makeup image, wherein the virtual makeup image includes a plurality of reference key points, the reference key points including human face key points of a two-dimensional human face; and acquiring a target image fused with the virtual makeup image by fusing the virtual makeup image and the target image with each of t he reference key points in the virtual makeup image aligned with a corresponding hu man face key point.

In some embodiments, the virtual makeup image is acquired by: detecting a plurality of human face key points of a three-dimensional human face in a first template image; acquiring a second template image by tiling the three-dimensional human face in the first template image, wherein the second template image includes a two-dimensional human face and a plurality of human face key points of the two-dimensional human face; and generating the virtual makeup image based on the two-dimensional human face in the second template image, wherein the reference key points of the virtual makeup image, the reference key points includes a plurality of human face key points of the two-dimensional human face.

In some embodiments, the one or more computer programs, when loaded and run by the one or more processors 201, cause the one or more processors 201 to execute instructions for: acquiring a plurality of first combined areas of the target image, wherein the first combined areas do not overlap with one another and each of the first combined areas is defined based on at least three human face key points of the target image; acquiring a plurality of second combined areas of the virtual makeup image, wherein the second combined areas are defined based on reference key points in the virtual makeup image which corresponding the at least three human face key points; and acquiring the target image fused with the virtual makeup image by fusing the virtual makeup image and the target image with each of the first combined areas coinciding with a corresponding second combined area in the virtual makeup image.

In some embodiments, the one or more computer programs, when loaded and run by the one or more processors 201, cause the one or more processors 201 to execute instructions for: acquiring the first combined areas which do not overlap with one another by combining at least three human face key points of the human face key points each time based on a preset sequence of the human face key points; and acquiring the second combined areas which do not overlap with one another by combining at least three reference key points of the reference key points each time based on a preset sequence of the reference key points.

In some embodiments, the one or more computer programs, when loaded and run by the one or more processors 201, cause the one or more processors 201 to execute instructions for: adjusting the size and angle of any of the second combined areas based on a size and angle of a corresponding first combined area, and covering the corresponding first combined area with the adjusted second combined area.

In some embodiments, the one or more computer programs, when loaded and run by the one or more processors 201, cause the one or more processors 201 to execute instructions for: acquiring first sequence identifiers of a plurality of the human face key points and second sequence identifiers of a plurality of the reference key points; and acquiring the target image fused with the virtual makeup image by fusing, the virtual makeup image and the target image with each of the reference key points in the virtual makeup image aligned with a human face key point having a corresponding sequence identifier.

In some embodiments, the one or more computer programs, when loaded and run by the one or more processors 201, cause the one or more processors 201 to execute instructions for: acquiring a virtual makeup image set including a plurality of virtual makeup images arranged in a sequence; and selecting one virtual makeup image from a plurality of the virtual makeup images each time based on the sequence of a plurality of the virtual makeup images.

In some embodiments, the one or more computer programs, when loaded and run by the one or more processors 201, cause the one or more processors 201 to execute instructions for: acquiring a video frame sequence including a plurality of video frames arranged in a sequence; and selecting one video frame from a plurality of the video frames based on the sequence of a plurality of the video frames each time as the target image.

In some embodiments, the one or more computer programs, when loaded and run by the one or more processors 201, cause the one or more processors 201 to execute instructions for: acquiring a virtual makeup image set including a plurality of virtual makeup images arranged in a sequence; and selecting a virtual makeup image from a plurality of the virtual makeup images having the same sequence with a currently acquired target image each time based on the sequence of a plurality of the virtual makeup images.

The server may be a wired or wireless network interface, a keyboard, an I/O interface or the like for input and output. The server may also include other components for realizing the functions of the device, which is not repeated herein. In some embodiments, the server 300 can execute the instructions executed by the server performing the above method for processing images.

The terminal in the embodiment shown in FIG. 2 and the server in the embodiment shown in FIG. 3 are electronic devices respectively. The electronic device includes: one or more processors; and a volatile or non-volatile memory configured to store one or more computer programs including one or more instructions executable by the one or more processors. The one or more computer programs, when loaded and run by the one or more processors, cause the one or more processors to perform the method for processing images as described above.

In an embodiment, a non-transitory computer-readable storage medium storing one or more computer programs including one or more instructions is provided. The one or more computer program, when loaded and run by a processor of an electronic device, cause the electronic device to perform a method for processing images. The method includes: acquiring a target image; detecting a plurality of human face key points of a three-dimensional human face in the target image; acquiring a virtual makeup image, wherein the virtual makeup image includes a plurality of reference key points, a plurality of reference key points including human face key points of a two-dimensional human face; and acquiring a target image fused with the virtual makeup image by fusing the virtual makeup image and the target image with each of the reference key points in the virtual makeup image aligned with a corresponding human face key point.

In some embodiments, the virtual makeup image is acquired by: detecting a plurality of human face key points of a three-dimensional human face in a first template image; acquiring a second template image by tiling the three-dimensional human face in the first template image, wherein the second template image includes a two-dimensional human and a plurality of human face key points of the two-dimensional human face; and generating the virtual makeup image based on the two-dimensional human face in the second template image, wherein the reference key points of the virtual makeup image, the reference key points includes a plurality of human face key points of the two-dimensional human face.

In some embodiments, the one or more computer programs, when loaded and run by the processor of the electronic device, cause electronic device to execute instructions for: defining a plurality of first combined areas of the target image which do not overlap with one another, each of the first combined areas is defined based on at least three human face key points; defining a plurality of second combined areas of the virtual makeup image, wherein the second combined areas are defined based on reference key points in the virtual makeup image which corresponding the at least three human face key points; acquiring the target image fused with the virtual makeup image by fusing, based on positions of the plurality of the first combined areas and positions of the plurality of the second combined areas, the virtual makeup image and the target image with each of the first combined areas coinciding with a corresponding second combined area in the virtual makeup image.

In some embodiments, the one or more computer programs, when loaded and run by the processor of the electronic device, cause the electronic device to execute instructions for: acquiring the first combined areas which do not overlap with one another by combining at least three human face key points of the human face key points each time based on a preset sequence of the human face key points; and acquiring the second combined areas which do not overlap with one another by combining at least three reference key points of the reference key points each time based on a preset sequence of the reference key points.

In some embodiments, the one or more computer programs, when loaded and run by the processor of the electronic device, cause electronic device to execute instructions for: adjusting the size and angle of any of the second combined areas based on a size and angle of a corresponding first combined area, and covering the corresponding first combined area with the adjusted second combined area.

In some embodiments, the one or more computer programs, when loaded and run by the processor of the electronic device, cause the electronic device to execute instructions for: acquiring first sequence identifiers of a plurality of the human face key points and second sequence identifiers of a plurality of the reference key points; and acquiring the target image fused with the virtual makeup image by fusing the virtual makeup image and the target image with each of the reference key points in the virtual makeup image aligned with a human face key point having a corresponding sequence identifier.

In some embodiments, the one or more computer programs, when loaded and run by the processor of the electronic device, cause the electronic device to execute instructions for: acquiring a virtual makeup image set including a plurality of virtual makeup images arranged in a sequence; and selecting one virtual makeup image from a plurality of the virtual makeup images each time based on the sequence of a plurality of the virtual makeup images.

In some embodiments, the one or more computer programs, when loaded and run by the processor of the electronic device, cause electronic device to execute instructions for: acquiring a video frame sequence including a plurality of video frames arranged in a sequence; and selecting one video frame from a plurality of the video frames based on the sequence of a plurality of the video frames each time as the target image.

In some embodiments, the one or more computer programs, when loaded and run by the processor of the electronic device, cause the electronic device to execute instructions for: acquiring a virtual makeup image set including a plurality of virtual makeup images arranged in a sequence; and selecting a virtual makeup image from a plurality of the virtual makeup images having a same sequence with a currently acquired target image each time based on the sequence of a plurality of the virtual makeup images.

In an embodiment, a computer program product including one or more instructions is provided. The computer program product, when loaded and run by a processor of an electronic device, causes the electronic device to perform a method for processing images. The method includes: acquiring a target image; detecting a plurality of human face key points of a three-dimensional human face in the target image; acquiring a virtual makeup image, wherein the virtual makeup image includes a plurality of reference key points, the reference key points including human face key points of a two-dimensional human face; and acquiring a target image fused with the virtual makeup image by fusing the virtual makeup image and the target image with each of the reference key points in the virtual makeup image aligned with a corresponding human face key point.

In some embodiments, the virtual makeup image is acquired by: detecting a plurality of human face key points of a three-dimensional human face in a first template image; acquiring a second template image by tiling the three-dimensional human face in the first template image, wherein the second template image includes a two-dimensional human face and a plurality of human face key points of the two-dimensional human face; and generating the virtual makeup image based on the two-dimensional human face in the second template image, and taking the human face key points of the two-dimensional human face as the reference key points of the virtual makeup image, wherein the reference key points of the virtual makeup image, the reference key points includes a plurality of human face key points of the two-dimensional human face.

In some embodiments, the computer program product, when loaded and run by the processor of the electronic device, causes the electronic device to execute instructions for: defining a plurality of first combined areas of the target image which do not overlap with one another, each of the first combined areas is defined based on at least three human face key points; defining a plurality of second combined areas of the virtual makeup image, wherein the second combined areas are defined based on reference key points in the virtual makeup image which corresponding the at least three human face key points; and acquiring the target image fused with the virtual makeup image by fusing, based on positions of the first combined areas and positions of the second combined areas, the virtual makeup image and the target image with each of the first combined areas coinciding with a corresponding second combined area in the virtual makeup image.

In some embodiments, the computer program product, when loaded and run by the processor of the electronic device, causes the electronic device to execute instructions for: acquiring the first combined areas which do not overlap with one another by combining at least three human face key points of a plurality of the human face key points each time based on a preset sequence of the human face key points; and acquiring the second combined areas which do not overlap with one another by combining at least three reference key points of a plurality of the reference key points for each time based on a preset sequence of a plurality of the reference key points.

In some embodiments, the computer program product, when loaded and run by the processor of the electronic device, causes the electronic device to execute instructions for: adjusting a size and angle of any of a plurality of the second combined areas based on a size and angle of a corresponding first combined area, and covering the corresponding first combined area with the adjusted second combined area.

In some embodiments, the computer program product, when loaded and run by the processor of the electronic device, causes the electronic device to execute instructions for: acquiring first sequence identifiers of a plurality of the human face key points and second sequence identifiers of a plurality of the reference key points; and acquiring the target image fused with the virtual makeup image by fusing the virtual makeup image and the target image with each of the reference key points in the virtual makeup image aligned with a human face key point having a corresponding sequence identifier.

In some embodiments, the computer program product, when loaded and run by the processor of the electronic device, causes the electronic device to execute instructions for: acquiring a virtual makeup image set including a plurality of virtual makeup images arranged in a sequence; and selecting one virtual makeup image from the plurality of the virtual makeup images each time based on the sequence of the virtual makeup images.

In some embodiments, the computer program product, when loaded and run by the processor of the electronic device, causes the electronic device to execute instructions for: acquiring a video frame sequence including a plurality of video frames arranged in a sequence; and selecting one video frame from the plurality of the video frames based on the sequence of the video frames each time as the target image.

In some embodiments, the computer program product, when loaded and run by the processor of the electronic device, causes the electronic device to execute instructions for: acquiring a virtual makeup image set including a plurality of virtual makeup images arranged in a sequence; and selecting a virtual makeup image from the plurality of the virtual makeup images having a same sequence with a currently acquired target image each time based on the sequence of the plurality of the virtual makeup images.

Figure 4:
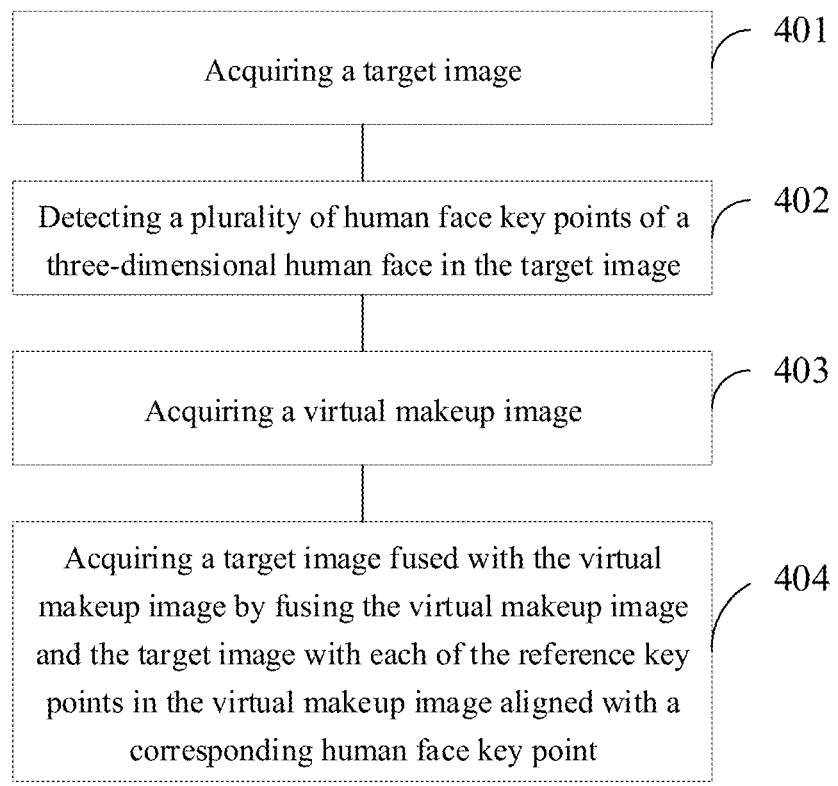
FIG. 4 is a flow chart of a method for processing images according to an embodiment.

FIG. 4 is a flowchart of a method for processing images according to an embodiment. Referring to FIG. 4, the method is applicable to an electronic device and includes the following content.

In 401, acquiring a target image.

In 402, a plurality of human face key points of a three-dimensional human face in the target image are detected.

In 403, acquiring a virtual makeup image.

The virtual makeup image includes a plurality of reference key points, and the reference key points indicate human face key points of a two-dimensional human face.

In 404, a target image fused with the virtual makeup image is acquired by fusing the virtual makeup image and the target image with each of the reference key points in the virtual makeup image aligned with a corresponding human face key point.

In some embodiments, acquiring a virtual makeup image includes:

detecting a plurality of human face key points of a three-dimensional human face in a first template image;

acquiring a second template image by tiling the three-dimensional human face in the first template image, wherein the second template image comprises a two-dimensional human face and a plurality of human face key points of the two-dimensional human face; and generating the virtual makeup image based on the two-dimensional human face in the second template image, wherein the human face key points of the two-dimensional human face are taken as the reference key points of the virtual makeup image.

In other embodiments, acquiring the target image fused with the virtual makeup image includes:

acquiring a plurality of first combined areas which do not overlap with one another, wherein each of the plurality of first combined areas is acquired by combining at least three human face key points in the target image;

acquiring a plurality of second combined areas which do not overlap with one another, wherein each of the plurality of second combined areas is acquired by combining reference key points corresponding to the at least three human face key points of a corresponding first combined area; and acquiring the target image fused with the virtual makeup image by fusing the virtual makeup image and the target image with each of the first combined areas coinciding with a corresponding second combined area in the virtual makeup image.

In other embodiments, acquiring the plurality of first combined areas which do not overlap with one another includes:

combining at least three human face key points each time from the plurality of human face key points for multiple times according to a preset sequence of the plurality of human face key points, to acquire the plurality of first combined areas which do not overlap with one another; and acquiring the plurality of second combined areas which do not overlap with one another includes:

combining at least three reference key points each time from the plurality of reference key points for multiple times according to a preset sequence of the plurality of reference key points, to acquire the plurality of second combined areas which do not overlap with one another.

In other embodiments, fusing the virtual makeup image and the target image with each of the reference key points in the virtual makeup image aligned with the corresponding human face key point includes:

adjusting a size and angle of each of the second combined areas based on a size and angle of a corresponding first combined area, and covering the corresponding first combined area with the adjusted second combined area.

In other embodiments, acquiring the target image fused with the virtual makeup image includes:

acquiring first sequence identifiers of the plurality of human face key points and second sequence identifiers of the reference key points, wherein the first sequence identifiers have a one-to-one correspondence with the second sequence identifiers; and acquiring the target image fused with the virtual makeup image by fusing, the virtual makeup image and the target image with each of the reference key points in the virtual makeup image aligned with a human face key point having a corresponding sequence identifier.

In other embodiments, acquiring the virtual makeup image includes:

acquiring a virtual makeup image set including a plurality of virtual makeup images arranged in sequence; and selecting one virtual makeup image from the virtual makeup images each time according to the sequence of the virtual makeup images.

In other embodiments, acquiring the target image comprises:

acquiring a video frame sequence including a plurality of video frames arranged in sequence; and selecting a video frame from the video frames according to the sequence of the video frames.

In other embodiments, acquiring the virtual makeup image includes:

acquiring a virtual makeup image set including a plurality of virtual makeup images arranged in sequence; and selecting a virtual makeup image having a same sequential number with a currently acquired target image from the plurality of virtual makeup images.

Figure 5:
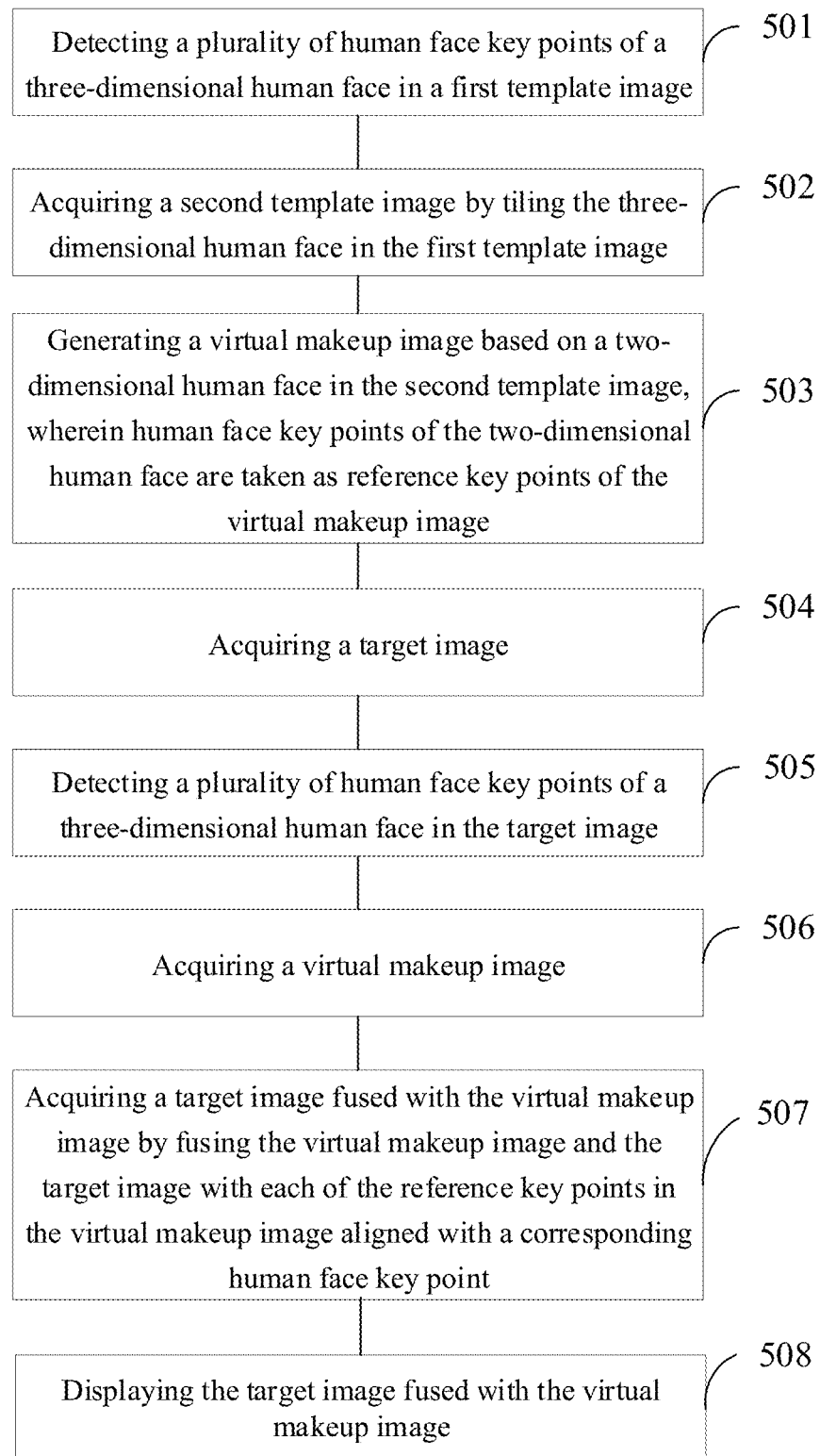
FIG. 5 is a flow chart of a method for processing images according to another embodiment.

FIG. 5 is a flowchart showing a method for processing images according to an embodiment. The method is applicable to an electronic device, and the electronic device is a terminal or a server. This embodiment takes that the method is applied to a terminal as an example for explanation. Referring to FIG. 5, the method includes the following content.

In 501, a plurality of human face key points of a three-dimensional human face in a first template image are detected.

The first template image is a human face image shot of the terminal, or a human face image downloaded from a server, or an image acquired in other ways. The method for acquiring the first template image is not limited in this embodiment. The first template image is a three-dimensional image, and the first template image includes the three-dimensional human face.

In some embodiments, the three-dimensional human face is a frontal human face, and the direct-sight direction of eyes of the three-dimensional human face is perpendicular to the first template image. In this way, the first template image includes all parts of the three-dimensional human face.

After acquiring the first template image, the terminal may detect the plurality of human face key points of the three-dimensional human face in the first template image.

The three-dimensional human face includes areas of different parts, and the human face key points include key points of different parts. In some embodiments, the three-dimensional human face includes a mouth area, a nose area, an eye area, an ear area, etc. By detecting the human face key points of the three-dimensional human face, the terminal detects mouth key points, nose key points, eye key points, ear key points, human face contour key points, etc. of the three-dimensional human face, all of which belong to the human face key points of the three-dimensional human face.

When detecting the human face key points of the three-dimensional human face, the terminal adopts a human face key point detection algorithm to detect the human face key points in the three-dimensional human face.

The human face key point detection algorithm may be a neural network algorithm, a convolutional neural network algorithm, or other algorithms, which is not specifically limited in this embodiment.

In some embodiments, the process of detecting the human face key points is implemented by a key point detection model. When detecting the human face key points of the three-dimensional human face, the terminal inputs the first template image containing the three-dimensional human face into the key point detection model, and acquires the plurality of human face key points of the three-dimensional human face in the first template image based on the key point detection model.

The terminal inputs the first template image into the key point detection model, and the key point detection model performs feature extraction on the first template image, determines positions of the human face key points based on human face features, and outputs the positions of the plurality of human face key points of the three-dimensional human face in the first template image.

In some embodiments, the key point detection model is trained by the terminal. The terminal stores the trained key point detection model, and the stored key point detection model is called when detection of the key points is required.

In some embodiments, the key point detection model is trained by a training device. The training device sends the trained key point detection model to the terminal, and the terminal stores the trained key point detection model such that the trained key point detection model may be called when detection of the key points is required. The training device is other terminals or servers.

The key point detection model is a neural network model, a convolutional neural network model, or other models, which is not limited in this embodiment.

In some embodiments, the key point detection model is acquired by training based on a plurality of sample human face images and corresponding sample human face key points. The training process includes: acquiring a plurality of sample human face images, and acquiring the key point detection model by training based on the plurality of sample human face images and sample human face key points in the sample human face images. The sample human face key points refer to correct and true human face key points in the sample human face images, i.e., true values.

In the process of training the key point detection model, for each sample human face image in the plurality of sample human face images, the sample human face image is input into the key point detection model, test human face key points of the sample human face image are acquired based on the key point detection model, an error between the sample human face key points and the test human face key points is acquired, and model parameters of the key point detection model are adjusted based on the acquired error to obtain the trained key point detection model.

The test human face key points are acquired by detecting human face key points on the sample human face image based on the untrained key point detection model. The test human face key points are predicted values. Whether the predicted values are accurate may be determined based on the true values, i.e., the error between the sample human face key points and the key points of the test human face key points may measure the accuracy of the key point detection model. It is understandable that the smaller the error is, the more approximate the test human face key points acquired by the key point detection model are to the sample human face key points, and the better the accuracy of the key point detection model is.

In 502, a second template image is acquired by tiling the three-dimensional human face in the first template image, wherein the second template image includes a two-dimensional human face acquired by tiling the three-dimensional human face and a plurality of human face key points of the two-dimensional human face.

When the three-dimensional human face in the first template image is stereo, and a side area is present, the distance between any two human face key points in the side area in the first template image is smaller than the distance between the any two human face key points in an actual three-dimensional human face. The side area forms a relatively large angle with the first template image, and the distance between any two key points of the side area projected on the first template image may be reduced. That is, the distance between any two human face in the side area of the first template image is visually smaller than the distance between the two in a three-dimensional space.

The terminal acquires the second template image by tiling the three-dimensional human face in the first template image. After tiling, all parts of the three-dimensional human face may be reflected perfectly in the two-dimensional human face. The distance between the key points in the second template image equals the distance in the actual three-dimensional human face.

Figure 6:
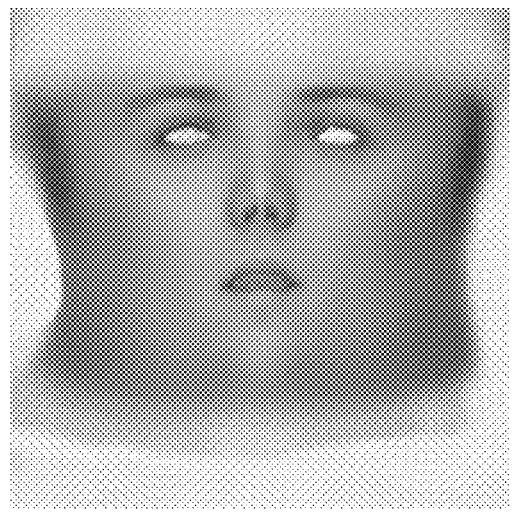
FIG. 6 is a schematic diagram of a second template image according to an embodiment.

In some embodiments, the three-dimensional human face in the first template image is tiled to obtain the second template image shown in FIG. 6. The second template image is an image acquired by spreading the three-dimensional human face.

The human face key points of the three-dimensional human face in the first template image have been detected. During tiling of the three-dimensional human face in the first template image, the human face key points in the three-dimensional human face may be moved with spreading of the three-dimensional human face. After the second template image is acquired by tiling the three-dimensional human face in the first template image, the second template image may also include a plurality of human face key points, i.e., the second template image includes the two-dimensional human face acquired by tiling the three-dimensional human face and the plurality of human face key points of the two-dimensional human face.

In the process of tiling the three-dimensional human face of the first template image, the three-dimensional human face is converted into the two-dimensional human face. There are still a plurality of human face key points in the two-dimensional human face, i.e., the plurality of human face key points in the three-dimensional human face may be all converted into the human face key points in the two-dimensional human face. Therefore, the human face key points in the first template image respectively match the human face key points in the second template image.

In some embodiments, the terminal adopts a human face reconstruction algorithm to tile the three-dimensional human face in the first template image, or the terminal adopts other algorithms to tile the three-dimensional human face.

In 503, a virtual makeup image is generated based on the two-dimensional human face in the second template image, wherein the human face key points of the two-dimensional human face are taken as the reference key points of the virtual makeup image.

The two-dimensional human face in the second template image is acquired after tiling the three-dimensional human face of the first template image, virtual makeup is added to the two-dimensional human face based on the two-dimensional human face in the second template image. That is, the virtual makeup image matching the two-dimensional human face is generated. Since the virtual makeup image is generated based on the two-dimensional human face, and the second template image includes the human face key points, the human face key points in the second template image are taken as the reference key points of the virtual makeup image. Then, according to the reference key points of the virtual makeup image, the virtual makeup image is fused with a human face image.

The virtual makeup image is acquired by depicting in the two-dimensional human face by a developer, or is automatically generated by the terminal based on the two-dimensional human face, or is generated in other ways.

In some embodiments, when the virtual makeup image is generated based on the two-dimensional human face, the position of the virtual makeup may be determined based on the human face key points in the two-dimensional human face, and the virtual makeup is added to the position to obtain the virtual makeup image. The virtual makeup may be a sticker or in other forms, which is not limited in the embodiments of the present disclosure.

Figure 7:
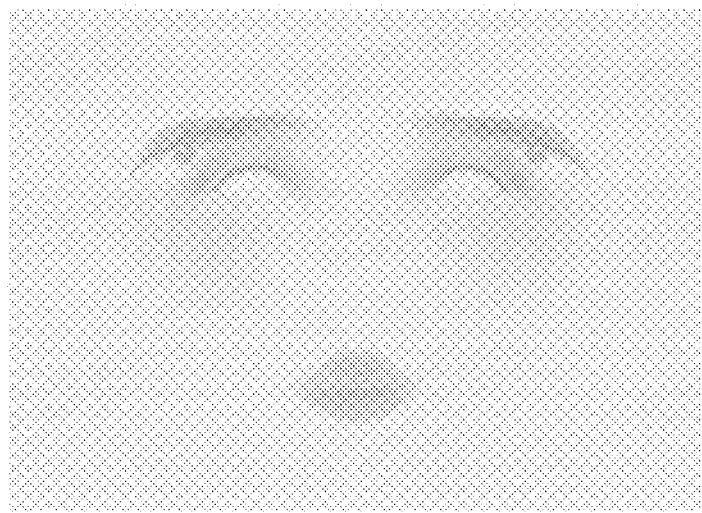
FIG. 7 is a schematic diagram of a virtual makeup image according to an embodiment.

For example, the second template image shown in FIG. 6 is acquired after tiling the three-dimensional human face in the first template image, and then the virtual makeup image shown in FIG. 7 is generated based on the second template image.

In some embodiments, after generating the virtual makeup image, the terminal stores the virtual makeup image. Alternatively, after generating the virtual makeup image, the terminal sends the virtual makeup image to a server for storage. Alternatively, the virtual makeup image is generated by the server and sent to the terminal, and the terminal stores the virtual makeup image.

It should be noted that this embodiment is only described by taking the example of continuing to perform 504 after the virtual makeup image is generated by performing 501 to 503, but does not limit timing of 504. In some embodiments, 501 to 503 are performed by other devices, and 504 to 508 are not performed until a target image is acquired.

In addition, this embodiment is only described by taking the example of generating the virtual makeup image by performing 501 to 503. In another embodiment, the virtual makeup image may also be acquired in other ways.

In 504, a target image is acquired.

The target image includes a three-dimensional human face and is a three-dimensional image.

The three-dimensional human face of the target image is at any angle, and the angle of the three-dimensional human face is an angle between a direct-sight direction of the eyes and a normal direction of the target image. For example, when the direct-sight direction of the eyes of the three-dimensional human face is perpendicular to the target image, the angle of the three-dimensional human face is 0°, and when the direct-sight direction of the eyes of the three-dimensional human face is the right and forms an angle of 80° with the target image, it means that the three-dimensional human face deflects to the right by 10°. In some embodiments, the three-dimensional human face deflects to the right by 20° or others, or deflects to the left by 10°, 20° or others. When the direct-sight direction of the eyes of the three-dimensional human face is parallel to the target image, the angle of the three-dimensional human face is 90°, and the target image shows the side area of the three-dimensional human face.

The target image may be shot by the terminal, or downloaded by the terminal, or acquired by other means.

In some embodiments, the target image is a video frame in a video frame sequence, so that each video frame in the video frame sequence may be used as the target image, and each video frame may be fused with the virtual makeup image. In some embodiments, the angles of the three-dimensional human face are the same in different video frames. In some embodiments, the angles of the three-dimensional face are different in different video frames.

In 505, a plurality of human face key points of a three-dimensional human face in the target image are detected.

In this embodiment, the terminal may subsequently fuse the virtual makeup image with the target image. During the fusion, it is necessary to determine how to fuse based on the human face key points, so as to fuse the two images more fitly. Therefore, the terminal detects the plurality of human face key points of the three-dimensional human face in the target image as reference for subsequent fusion.

The process of detecting the human face key points in 505 is similar to the process of detecting the plurality of human face key points in 502, which is not repeated herein.

In 506, a virtual makeup image is acquired.

The virtual makeup image includes a plurality of reference key points, and the plurality of reference key points in the virtual makeup image are represented by the human face key points of the two-dimensional human face. The virtual makeup image is a two-dimensional image.

In some embodiments, the virtual makeup image is generated based on the two-dimensional human face. For the specific generating process, reference may be made to 501 to 503, which is not repeated herein.

In some embodiments, the virtual makeup image is stored in the server, and the terminal acquires the virtual makeup image from the server.

The terminal sends a virtual makeup image acquisition request to the server. When receiving the virtual makeup image acquisition request, the server sends the virtual makeup image corresponding to the virtual makeup image acquisition request to the terminal, and the terminal receives the virtual makeup image sent by the server.

In other embodiments, the virtual makeup image is stored in the terminal, and the terminal may directly acquire the virtual makeup image.

When the virtual makeup image is stored in the server, after acquiring a plurality of virtual makeup images from the server or directly acquiring a plurality of virtual makeup images stored in itself, the terminal displays the acquired a plurality of virtual makeup images, such that the user may view the displayed a plurality of virtual makeup images, and may also trigger a selection operation of any virtual makeup image. When detecting the selection operation of any virtual makeup image, the terminal determines selection of the virtual makeup image, and subsequently fuses the virtual makeup image and the target image.

In 507, a target image fused with the virtual makeup image is acquired by fusing the virtual makeup image and the target image with each of the reference key points in the virtual makeup image aligned with a corresponding human face key point.

The virtual makeup image is fused with the target image based on the positions of the plurality of human face key points and the positions of the plurality of reference key points. Each of the reference key points in the virtual makeup image is aligned with the corresponding human face key point in the target image, such that the target image fused with the virtual makeup image is acquired.

That is, during fusion of the virtual makeup image with the three-dimensional human face in the target image, for each of the plurality of reference key points in the virtual makeup image, the reference key point is made aligned with the corresponding human face key point based on the position of the reference key point and the position of the corresponding human face key point in the target image, and then the next reference key point in the virtual makeup image is made aligned with the corresponding human face key point based on the position of the next reference key point in the virtual makeup image and the position of the corresponding human face key point in the target image. In this process, the virtual makeup image may be adjusted in size and angle so e that the next reference key point is aligned with the corresponding human face key point in the target image. After the adjustment, the size and the angle of the makeup of each part in the virtual makeup image are consistent with those of each part in the three-dimensional human face, realizing a perfect fit. Similarly, the plurality of reference key points of the virtual makeup image may be aligned with the human face key points in the target image respectively.

In some embodiments, the terminal fuses the two images in such a way that combined areas composed of the key points in the two images coincide. The terminal acquires a plurality of first combined areas that do not overlap with one another by combining at least any three of the plurality of human face key points in the target image, and acquires a plurality of second combined areas that do not overlap with one another by combining at least three of the reference key points in the virtual makeup image. The target image fused with the virtual makeup image is acquired by fusing the virtual makeup image and the target image with each of the first combined areas in the virtual makeup image coinciding with the corresponding second combined area. In some embodiments, by two areas "coinciding" with each other, it means that the one area exactly covers the other area and the two areas are the same in shape, size and position in the respective image. In some embodiments, by two areas "not overlapping" with each other, it means that the two areas do not have other overlapped region than at most a common edge where the two areas meet. That is, except the common edge where the two areas meet, the two areas do not have other overlapped region. In other cases, the two areas may have no overlapped region at all.

Each of the first combined areas in the virtual makeup image coincides with the corresponding second combined area, and the human face key points that constitute each of the first combined areas are aligned with the reference key points that constitute the corresponding second combined area.

In some embodiments, when obtaining the combined areas in the two images by means of combination, the terminal may perform combination for multiple times to determine the combined areas that do not overlap with one another according to a preset sequence of the key points. The terminal acquires the first combined areas that do not overlap with one another by combining at least three of the human face key points each time based on a preset sequence of the human face key points, and acquires the second combined areas that do not overlap with one another by combining at least three of the reference key points each time according to a preset sequence of the reference key points.

The preset sequence is a sequence from left to right, a sequence from top to bottom, or other sequences. In addition, the number of the human face key points adopted for each combination is the same as the number of the reference key points.

During the combination, at least three human face key points are first extracted from the plurality of human face key points each time according to the preset sequence and a plurality of groups of human face key points are acquired, i.e., each group includes at least three human face key points. Then, the human face key points in each group are combined to form a plurality of first combined areas that do not overlap with one another. In the same way, at least three reference key points are extracted from the plurality of reference key points each time, and a plurality of groups of reference key points are acquired, i.e., each group includes at least three reference key points. Then, the reference key points in each group are combined to form a plurality of second combined areas that do not overlap with one another. In addition, the first combined areas acquired by the combination are arranged in sequence, and the second combination areas are also arranged in sequence.

After that, the second combined area corresponding to each of the first combined areas is determined based on the positions of the first combined areas and the positions of the second combined areas. Each of the second combined areas is adjusted in size and angle, such that the adjusted second combined area coincides with the corresponding first combined area and the target image fused with the virtual makeup image is acquired.

That is, during fusion of the second combined areas with the three-dimensional human face in the target image, for each of the second combined areas, when the second combined area is made coincide with the corresponding first combined area based on the position of the second combined area and the position of the corresponding first combined area in the target image, and then the next second combined area is made coincide with the corresponding first combined area based on the position of the next second combined area and the position of the corresponding first combined area in the target image, in this process, the virtual makeup image may be adjusted in size and angle so that the next second combined area coincides with the corresponding first combined area in the target image. Similarly, the plurality of second combined areas may coincide with the corresponding first combined areas in the target image.

For example, from left to right of the plurality of human face key points, three of the plurality of human face key points are combined each time and one first combined area is acquired, and the first combined areas that do not overlap with one another may be acquired after a plurality of combinations; and from left to right of the plurality of reference key points, three of the reference key points are combined each time and one second combined area is acquired. The virtual makeup image and the target image are fused, such that each of the first combined areas in the virtual makeup image coincides with the corresponding second combined area such that the target image fused with the virtual makeup image is acquired.

The combined areas in the two images may coincide with one another in the way that the second combined areas cover the first combined areas. Then, in the aforementioned fusion process, the terminal adjusts the size and the angle of any of the second combined areas based on the size and the angle of the corresponding first combined area, and covers the corresponding first combined area with the adjusted second combined area. In this way, each of the second combined areas in the virtual makeup image is adjusted to be consistent with the corresponding first combined area in the target image, and then the first combined area is covered with the second combined area of the virtual makeup image. That is, the second combined area of the virtual makeup image is pasted onto the first combined area. Thus, the first combined area will appear as having the virtual makeup merged therein.

In some other embodiments, the first sequence identifiers of the plurality of human face key points and the second sequence identifiers of the plurality of reference key points are acquired; and the target image fused with the virtual makeup image is acquired by fusing the virtual makeup image and the target image are fused with each of the reference key points in the virtual makeup image aligned with a human face key point having a corresponding sequence identifier.

The first sequence identifiers are configured to indicate the sequential numbers of the plurality of human face key points, and the second sequence identifiers are configured to indicate the sequential numbers of the plurality of reference key points. It should be noted that the first sequence identifiers may have a one-to-one correspondence with the second sequence identifiers. In some embodiments, the number of the human face key points is exactly the same as that of the reference key points, and the first sequence identifiers of the human face key points are exactly the same as the second sequence identifiers of the reference key points. For example, the first sequence identifiers may be 1, 2, 3 . . . or other numerical values, and the second sequence identifiers may also be 1, 2, 3 . . . or other numerical values.

Both of the plurality of human face key points and the plurality of reference key points have the sequence identifiers. The target image may be fused with the virtual makeup image based on the first sequence identifiers of the plurality of human face key points and the second sequence identifiers of the plurality of reference key points.

For each of the reference key points in the virtual makeup image, the position of the reference key point and the position of the human face key point having the corresponding sequence identifier as the reference key point are determined, and the reference key point is aligned with the corresponding face key point. After that, the position of the next reference key point in the virtual makeup image and the position of the human face key point having the corresponding sequence identifier as the next reference key point, and the next reference key point in the virtual makeup image is aligned with the corresponding human face key point. In this process, the virtual makeup image may be adjusted in size and angle so that the next reference key point is aligned with the corresponding human face key point in the target image. Similarly, the plurality of reference key points of the virtual makeup image may be aligned with the human face key points in the target image respectively.

For example, the target image includes the human face key points having the first sequence identifiers 1, 2, 3 and 4, and the virtual makeup image includes the reference key points having the second sequence identifiers 1, 2, 3 and 4. It is determined that the human face key point having the sequence identifier 1 corresponds to the reference key point having the sequence identifier 1, the human face key point having the sequence identifier 2 corresponds to the reference key point having the sequence identifier 2, the human face key point having the sequence identifier 3 corresponds to the reference key point having the sequence identifier 3, and the human face key point having the sequence identifier 4 corresponds to the reference key point having the sequence identifier 4.

In some other embodiments, the first sequence identifiers of the plurality of human face key points and the second sequence identifiers of the plurality of reference key points are acquired. At least any three of the human face key points are combined each time based on the preset sequence of the human face key points and a plurality of first combined areas are acquired. For each of the first combined areas, the first sequence identifiers of the human face key points that constitute the area are determined. Then, the second sequence identifiers corresponding to the first sequence identifiers are acquired. The second combined area formed by the reference key points corresponding to the second sequence identifiers is acquired. The acquired second combined area corresponds to the first combined area. The virtual makeup image and the target image are fused based on the positions of the combined areas and the positions of the second combined areas, such that each of the first combined areas in the virtual makeup image coincides with the corresponding second combined area. In this way, the target image fused with the virtual makeup image is acquired.

According to the embodiments of the present disclosure, the first combined areas may be determined based on the human face key points in the target image, the second combined areas may be determined based on the reference key points in the virtual makeup image, and the virtual makeup image may be adjusted in size and angle based on the first combined areas and the second combined areas, such that the size of the virtual makeup image matches the size of the three-dimensional human face in the target image, and the virtual makeup image fits the three-dimensional human face in the target image.

It should be noted that this embodiment only takes that one virtual makeup image is fused with the target image as an example for explanation. In another embodiment, a plurality of virtual makeup images may also be fused with the target image.

The virtual makeup images are arranged in a sequence, and the virtual makeup images may constitute a dynamic virtual makeup image. By fusing the virtual makeup images with the target image, the effect of fusing the dynamic virtual makeup image in the target image may be achieved.

In some embodiments, one target image may be fused with the dynamic virtual makeup image, then 506 includes: acquiring a virtual makeup image set including a plurality of virtual makeup images arranged in sequence; and selecting one virtual makeup image from the virtual makeup images each time according to the sequence of the virtual makeup images. 507 includes: fusing the virtual makeup image acquired each time and the target image after acquiring the virtual makeup image. Since the virtual makeup images are dynamic virtual makeup images, the dynamic virtual makeup images are fused with the target image after the virtual makeup images are fused with the target image.

In some other embodiments, a dynamic target image may be fused with one virtual makeup image, or the dynamic target image may be fused with the dynamic virtual makeup image. During fusion of the dynamic target image with the dynamic virtual makeup image, 504 includes: acquiring a video frame sequence; and selecting one video frame from a plurality of video frames based on the sequence of the video frames each time as the target image. 505 includes: acquiring a virtual makeup image set; and selecting a virtual makeup image from a plurality of virtual makeup images having the same sequence as a currently acquired target image each time based on the sequence of the virtual makeup images in the virtual makeup image set.

The video frame sequence includes a plurality of video frames arranged in a sequence, and each video frame in the video frame sequence is independent. When the video frames in the video frame sequence are played continuously, the video frames may form one video. In addition, the virtual makeup image set includes a plurality of virtual makeup images arranged in a sequence, and the virtual makeup images may constitute one dynamic virtual makeup image.

Since the target image and the virtual makeup image are fused is that one virtual makeup image is fused with one target image, one video frame is selected from the video frames each time according to the sequence of the video frames in the video frame sequence, and one virtual makeup image is selected from the virtual makeup images each time according to the sequence of the virtual makeup images in the virtual makeup image set. Therefore, by fusing the virtual makeup image and the target image in sequence according to the selected sequence, during video playback, the virtual makeup image is also dynamically played.

For example, when the video frame sequence includes three video frames and the virtual makeup image set includes three virtual makeup images, upon acquisition of a first video frame in the video frame sequence, a first virtual makeup image in the virtual makeup image set is acquired and fused with the first video frame, then a second video frame in the video frame sequence and a second virtual makeup image in the virtual makeup image set are acquired, the second virtual makeup image is fused with the second video frame, after that, a third video frame in the video frame sequence and a third virtual makeup image in the virtual makeup image set are acquired, and the third virtual makeup image is fused with the third video frame.

In addition, when the number of video frames in the video frame sequence is different from the number of virtual makeup images in the virtual makeup image set, 504 includes: acquiring a video frame sequence; and selecting one video frame from the video frames based on the sequence of the video frames each time as the target image. 505 includes: acquiring a virtual makeup image set; and selecting the next virtual makeup image of the last selected virtual makeup image from the virtual makeup images each time based on the sequence of the virtual makeup images in the virtual makeup image set.

When the last selected virtual makeup image is the last virtual makeup image in the virtual makeup image set, the first virtual makeup image in the virtual makeup image set is taken as the next virtual makeup image.

For example, when the video frame sequence includes 3 video frames and the virtual makeup image set includes two virtual makeup images, upon acquisition of a first video frame in the video frame sequence, a first virtual makeup image in the virtual makeup image set is acquired and fused with the first video frame, then, a second video frame in the video frame sequence and a second virtual makeup image in the virtual makeup image set are acquired, the second virtual makeup image is fused with the second video frame, a third video frame in the video frame sequence and the first virtual makeup image in the virtual makeup image set are acquired, and the first virtual makeup image is fused with the third video frame.

In 508, the target image fused with the virtual makeup image is displayed.

After the virtual makeup image and the target image are fused, the terminal may display the target image fused with the virtual makeup image, and the user may view the target image fused with the virtual makeup image.

In some embodiments, the user may also share the target image fused with the virtual makeup image with other users by the terminal, and the other users may also view the target image fused with the virtual makeup image.

In some other embodiments, the terminal displays the target image fused with the virtual makeup image by means of frame animation, skeletal animation, or particle system animation or others.

It should be noted that this embodiment only takes that the terminal serves as an execution subject as an example for explanation. In another embodiment, a server serves as the execution subject, and its execution process is similar to that of the foregoing embodiment which is not repeated herein.

When 501 to 503 are performed by taking the server as the execution subject, the server directly stores the virtual makeup image after generating the virtual makeup image. After fusing the virtual makeup image and the target image, the server sends the target image fused with the virtual makeup image to the terminal, and the terminal displays the target image fused with the virtual makeup image.

With the method according to the embodiments of the present disclosure, a target image is acquired; a plurality of human face key points of a three-dimensional human face in the target image are detected; a virtual makeup image which includes a plurality of reference key points is acquired; and a target image fused with the virtual makeup image is acquired by fusing the virtual makeup image and the target image with each of the reference key points in the virtual makeup image aligned with a corresponding human face key point.

Moreover, a plurality of first combined areas may be determined based on the human face key points in the target image, a plurality of second combined areas may be determined based on the reference key points in the virtual makeup image, and the virtual makeup image may be adjusted in size and angle based on the first combined areas and the second combined areas, such that the fused virtual makeup image fits the three-dimensional human face in the target image.

In addition, the target image may be fused with the virtual makeup images. The virtual makeup images may constitute a dynamic virtual makeup image, and thus the target image and the dynamic virtual makeup image can be fused. The video frame sequence may also be fused with a plurality of virtual makeup images to achieve the effect of fusing the video frame sequence with the dynamic virtual makeup image. The dynamic virtual makeup image may be displayed during playback of the video frame sequence.

Figure 8:
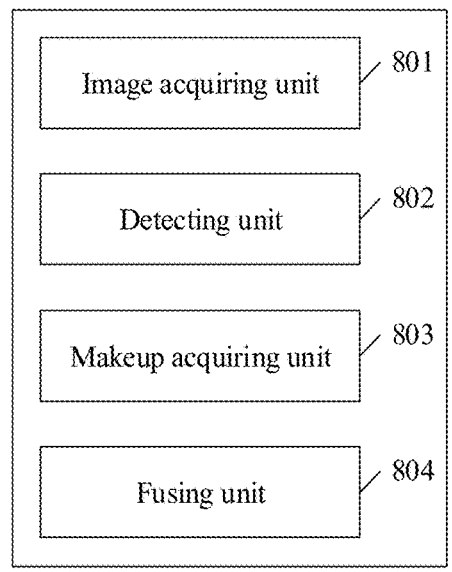
FIG. 8 is a schematic structural diagram of an apparatus for processing images according to an embodiment.

FIG. 8 is a schematic structural diagram of an apparatus for processing images according to an embodiment. Referring to FIG. 8, the apparatus includes:

an image acquiring unit 801 configured to acquire a target image;

a detecting unit 802, configured to detect a plurality of human face key points of a three-dimensional human face in the target image;

a makeup acquiring unit 803, configured to acquire a virtual makeup image, wherein the virtual makeup image includes a plurality of reference key points, the reference key points including human face key points of a two-dimensional human face; and a fusing unit 804, configured to acquire a target image fused with the virtual makeup image by fusing the virtual makeup image and the target image with each of the reference key points in the virtual makeup image aligned with a corresponding human face key point.

With the apparatus according to the embodiments of the present disclosure, a target image is acquired; a plurality of human face key points of a three-dimensional human face in the target image are detected; a virtual makeup image which includes a plurality of reference key points is acquired; and a target image fused with the virtual makeup image is acquired by fusing the virtual makeup image and the target image with each of the reference key points in the virtual makeup image aligned with a corresponding human face key point.

Figure 9:
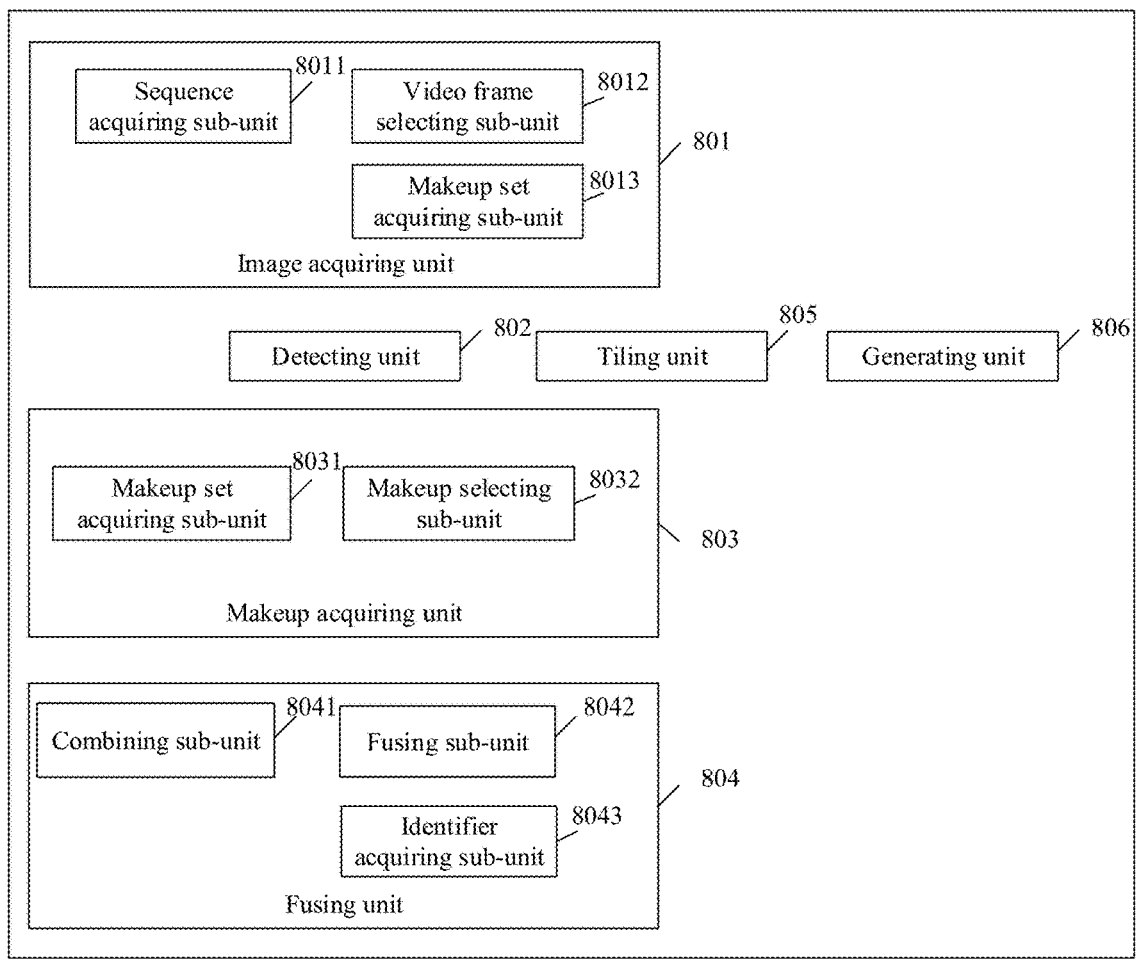
FIG. 9 is a schematic structural diagram of an apparatus for processing images according to another embodiment.

In some embodiments, referring to FIG. 9, the apparatus further includes:

a detecting unit 802, configured to detect a plurality of a three-dimensional human face in a first template image;

a tiling unit 805, acquiring a second template image by tiling the three-dimensional human face in the first template image; and a generating unit 806, configured to generate the virtual makeup image based on the two-dimensional human face in the second template image, wherein the human face key points of the two-dimensional human face are taken as the reference key points of the virtual makeup image.

In other embodiments, referring to FIG. 9, the fusing unit 804 includes:

a combining sub-unit 8041, configured to acquire a plurality of first combined areas which do not overlap with one another, wherein each of the plurality of first combined areas is acquired by combining at least three human face key points in the target image, and acquire a plurality of second combined areas which do not overlap with one another, wherein each of the plurality of second combined areas is acquired by combining reference key points corresponding to the at least three reference key points of a corresponding first combined area; and a fusing sub-unit 8042, configured to acquire the target image fused with the virtual makeup image by fusing the virtual makeup image and the target image with each of the first combined areas coinciding with a corresponding second combined area in the virtual makeup image.

In other embodiments, the combining sub-unit 8041 is configured to combine at least three human face key points each time from the plurality of human face key points for multiple times according to a preset sequence of the plurality of human face key points, to acquire the plurality of first combined areas which do not overlap with one another.

The combining sub-unit 8041 is further configured to combine at least three reference key points each time from the plurality of reference key points for multiple times according to a preset sequence of the plurality of reference key points, to acquire the plurality of second combined areas which do not overlap with one another.

In other embodiments, the fusing sub-unit 8042 is configured to: adjust a size and angle of each of the second combined areas based on a size and angle of a corresponding first combined area, and cover the corresponding first combined area with the adjusted second combined area.

In other embodiments, referring to FIG. 9, the fusing unit 804 includes: an identifier acquiring sub-unit 8043, configured to acquire first sequence identifiers of the plurality of human face key points and second sequence identifiers of the reference key points. In some embodiments, the first sequence identifiers have a one-to-one correspondence with the second sequence identifiers.

The fusing sub-unit 8042 is configured to acquire the target image fused with the virtual makeup image by fusing the virtual makeup image and the target image with each of the reference key points in the virtual makeup image aligned with a human face key point having a corresponding sequence identifier.

In other embodiments, referring to FIG. 7, the makeup acquiring unit 803 includes:

a makeup image set acquiring sub-unit 8031, configured to acquire a virtual makeup image set including a plurality of virtual makeup images arranged in a sequence; and a makeup selecting sub-unit 8032, configured to select one virtual makeup image from the virtual makeup images each time according to the sequence of the virtual makeup images.

In other embodiments, referring to FIG. 9, the image acquiring unit 801 includes:

a sequence acquiring sub-unit 8011, configured to acquire a video frame sequence including a plurality of video frames arranged in a sequence; and a video frame selecting sub-unit 8012, configured to select one video frame each time as the target image from the video frames according to the sequence of the video frames.

In other embodiments, referring to FIG. 9, the makeup acquiring unit 803 includes:

a makeup image set acquiring sub-unit 8031, configured to acquire a virtual makeup image set including a plurality of virtual makeup images arranged in sequence; and a makeup selecting sub-unit 8032, configured to select a virtual makeup image having a same sequential number with a currently acquired target image from the plurality of virtual makeup images.

Other embodiments of the present disclosure may be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as examples only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for processing images, comprising:
    acquiring a target image;
    detecting a plurality of human face key points of a three-dimensional human face in the target image;
    acquiring a virtual makeup image, wherein the virtual makeup image comprises a plurality of reference key points, the reference key points indicating human face key points of a two-dimensional human face; and
    acquiring a result image fused with the virtual makeup image by fusing the virtual makeup image and the target image with each of the reference key points in the virtual makeup image aligned with a corresponding human face key point of the three-dimensional human face in the target image,
    wherein said acquiring the virtual makeup image comprises:
        acquiring a video frame sequence comprising a plurality of video frames arranged in sequence;
    selecting a video frame from the video frames according to the sequence of the video frames;
        acquiring a virtual makeup image set comprising a plurality of virtual makeup images arranged in sequence; and
    selecting a virtual makeup image having a same sequential number with a currently acquired target image from the plurality of virtual makeup images.

2. The method according to claim 1, wherein said acquiring a virtual makeup image comprises:
    detecting a plurality of human face key points of a three-dimensional human face in a first template image;
    acquiring a second template image by tiling the three-dimensional human face in the first template image, wherein the second template image comprises a two-dimensional human face and a plurality of human face key points of the two-dimensional human face; and
    generating the virtual makeup image based on the two-dimensional human face in the second template image, wherein the human face key points of the two-dimensional human face are taken as the reference key points of the virtual makeup image.

3. The method according to claim 1, wherein said acquiring the target image fused with the virtual makeup image comprises:
    acquiring a plurality of first combined areas which do not overlap with one another, wherein each of the plurality of first combined areas is acquired by combining at least three human face key points in the target image;
    acquiring a plurality of second combined areas which do not overlap with one another, wherein each of the plurality of second combined areas is acquired by combining reference key points corresponding to the at least three human face key points of a corresponding first combined area; and
    acquiring the target image fused with the virtual makeup image by fusing the virtual makeup image and the target image with each of the first combined areas coinciding with a corresponding second combined area in the virtual makeup image.

4. The method according to claim 3, wherein said acquiring the plurality of first combined areas which do not overlap with one another comprises:
    combining at least three human face key points each time from the plurality of human face key points for multiple times according to a preset sequence of the plurality of human face key points, to acquire the plurality of first combined areas which do not overlap with one another; and
said acquiring the plurality of second combined areas which do not overlap with one another comprises:
    combining at least three reference key points each time from the plurality of reference key points for multiple times according to a preset sequence of the plurality of reference key points, to acquire the plurality of second combined areas which do not overlap with one another.

5. The method according to claim 3, wherein said fusing the virtual makeup image and the target image with each of the reference key points in the virtual makeup image aligned with the corresponding human face key point comprises:
adjusting a size and angle of each of the second combined areas based on a size and angle of a corresponding first combined area, and covering the corresponding first combined area with the adjusted second combined area.

6. The method according to claim 1, wherein said acquiring the target image fused with the virtual makeup image comprises:
acquiring first sequence identifiers of the plurality of human face key points and second sequence identifiers of the plurality of reference key points, wherein the first sequence identifiers have a one-to-one correspondence with the second sequence identifiers; and
acquiring the target image fused with the virtual makeup image by fusing the virtual makeup image and the target image with each of the reference key points in the virtual makeup image aligned with a human face key point having a corresponding sequence identifier.

7. The method according to claim 1, wherein said acquiring the virtual makeup image comprises:
acquiring a virtual makeup image set comprising a plurality of virtual makeup images arranged in sequence; and
selecting one virtual makeup image from the virtual makeup images each time according to the sequence of the virtual makeup images.

8. An electronic device comprising:
one or more processors; and
a volatile or non-volatile memory configured to store one or more computer programs comprising one or more instructions executable by the one or more processors,
wherein the one or more instructions, when executed by the one or more processors, cause the one or more processors to perform a method comprising:
acquiring a target image;
detecting a plurality of human face key points of a three-dimensional human face in the target image;
acquiring a virtual makeup image, wherein the virtual makeup image comprises a plurality of reference key points, the reference key points indicating human face key points of a two-dimensional human face; and
acquiring a result image fused with the virtual makeup image by fusing the virtual makeup image and the target image with each of the reference key points in the virtual makeup image aligned with a corresponding human face key point of the three-dimensional human face in the target image,
wherein said acquiring the virtual makeup image comprises:
acquiring a video frame sequence comprising a plurality of video frames arranged in sequence;
selecting a video frame from the video frames according to the sequence of the video frames;
acquiring a virtual makeup image set comprising a plurality of virtual makeup images arranged in sequence; and
selecting a virtual makeup image having a same sequential number with a currently acquired target image from the plurality of virtual makeup images.

9. The electronic device according to claim 8, wherein said acquiring a virtual makeup image comprises:
detecting a plurality of human face key points of a three-dimensional human face in a first template image;
acquiring a second template image by tiling the three-dimensional human face in the first template image, wherein the second template image comprises a two-dimensional human face and a plurality of human face key points of the two-dimensional human face; and
generating the virtual makeup image based on the two-dimensional human face in the second template image, wherein the human face key points of the two-dimensional human face are taken as the reference key points of the virtual makeup image.

10. The electronic device according to claim 8, wherein said acquiring the target image fused with the virtual makeup image comprises:
acquiring a plurality of first combined areas which do not overlap with one another, wherein each of the plurality of first combined areas is acquired by combining at least three human face key points in the target image;
acquiring a plurality of second combined areas which do not overlap with one another, wherein each of the plurality of second combined areas is acquired by combining reference key points corresponding to the at least three human face key points of a corresponding first combined area; and
acquiring the target image fused with the virtual makeup image by fusing the virtual makeup image and the target image with each of the first combined areas coinciding with a corresponding second combined area in the virtual makeup image.

11. The electronic device according to claim 10, wherein said acquiring the plurality of first combined areas which do not overlap with one another comprises:
combining at least three human face key points each time from the plurality of human face key points for multiple times according to a preset sequence of the plurality of human face key points, to acquire the plurality of first combined areas which do not overlap with one another; and
said acquiring the plurality of second combined areas which do not overlap with one another comprises:
combining at least three reference key points each time from the plurality of reference key points for multiple times according to a preset sequence of the plurality of reference key points, to acquire the plurality of second combined areas which do not overlap with one another.

12. The electronic device according to claim 10, wherein said fusing the virtual makeup image and the target image with each of the reference key points in the virtual makeup image aligned with the corresponding human face key point comprises:
adjusting a size and angle of each of the second combined areas based on a size and angle of a corresponding first combined area, and covering the corresponding first combined area with the adjusted second combined area.

13. The electronic device according to claim 8, wherein said acquiring the target image fused with the virtual makeup image comprises:
acquiring first sequence identifiers of the plurality of human face key points and second sequence identifiers of the plurality of reference key points, wherein the first sequence identifiers have a one-to-one correspondence with the second sequence identifiers; and
acquiring the target image fused with the virtual makeup image by fusing the virtual makeup image and the target image with each of the reference key points in the virtual makeup image aligned with a human face key point having a corresponding sequence identifier.

14. The electronic device according to claim 8, wherein said acquiring the virtual makeup image comprises:

acquiring a virtual makeup image set comprising a plurality of virtual makeup images arranged in sequence; and selecting one virtual makeup image from the virtual makeup images each time according to the sequence of the virtual makeup images.

15. A non-transitory computer-readable storage medium storing one or more computer programs comprising one or more instructions, wherein the one or more instructions, when executed by a processor of an electronic device, cause the electronic device to perform a method comprising:

acquiring a target image;

detecting a plurality of human face key points of a three-dimensional human face in the target image;

acquiring a virtual makeup image, wherein the virtual makeup image comprises a plurality of reference key points, the reference key points indicating human face key points of a two-dimensional human face; and acquiring a result image fused with the virtual makeup image by fusing the virtual makeup image and the target image with each of the reference key points in the virtual makeup image aligned with a corresponding human face key point of the three-dimensional human face in the target image, wherein said acquiring the virtual makeup image comprises:

acquiring a video frame sequence comprising a plurality of video frames arranged in sequence;

selecting a video frame from the video frames according to the sequence of the video frames;

acquiring a virtual makeup image set comprising a plurality of virtual makeup images arranged in sequence; and selecting a virtual makeup image having a same sequential number with a currently acquired target image from the plurality of virtual makeup images.

16. The non-transitory computer-readable storage medium according to claim 15, wherein said acquiring the target image fused with the virtual makeup image comprises:

acquiring a plurality of first combined areas which do not overlap with one another, wherein each of the plurality of first combined areas is acquired by combining at least three human face key points in the target image;

acquiring a plurality of second combined areas which do not overlap with one another, wherein each of the plurality of second combined areas is acquired by combining reference key points corresponding to the at least three human face key points of a corresponding first combined area; and acquiring the target image fused with the virtual makeup image by fusing the virtual makeup image and the target image with each of the first combined areas coinciding with a corresponding second combined area in the virtual makeup image.

* * * * *